United States Patent
Jones et al.

(10) Patent No.: US 10,600,026 B2
(45) Date of Patent: Mar. 24, 2020

(54) STOCKING LEVEL INDICATION SYSTEM AND METHOD

(71) Applicant: Walmart Apollo, LLC, Bentonville, AR (US)

(72) Inventors: Nicholaus A. Jones, Fayetteville, AR (US); Robert J. Taylor, Rogers, AR (US); Aaron J. Vasgaard, Rogers, AR (US); Matthew A. Jones, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 221 days.

(21) Appl. No.: 15/643,974

(22) Filed: Jul. 7, 2017

(65) Prior Publication Data

US 2018/0012180 A1 Jan. 11, 2018

Related U.S. Application Data

(60) Provisional application No. 62/359,933, filed on Jul. 8, 2016.

(51) Int. Cl.
*G06Q 10/08* (2012.01)
*G06Q 20/20* (2012.01)
*G06K 7/14* (2006.01)

(52) U.S. Cl.
CPC ....... *G06Q 10/0875* (2013.01); *G06K 7/1413* (2013.01); *G06K 7/1417* (2013.01); *G06Q 20/203* (2013.01); *G06Q 20/208* (2013.01)

(58) Field of Classification Search
None
See application file for complete search history.

(56) References Cited

U.S. PATENT DOCUMENTS

| 3,919,704 | A | 11/1975 | Heck | |
| 7,233,241 | B2 * | 6/2007 | Overhultz | A47F 10/02 |
| | | | | 211/59.2 |
| 7,356,495 | B2 * | 4/2008 | Beigl | G06K 7/10336 |
| | | | | 705/28 |
| 8,260,456 | B2 | 9/2012 | Siegel | |
| 9,206,614 | B2 * | 12/2015 | Richardson | E04B 2/8635 |
| 10,169,738 | B2 * | 1/2019 | Jones | G01G 19/52 |
| 10,173,774 | B2 * | 1/2019 | Jones | B64C 37/02 |
| 10,176,454 | B2 * | 1/2019 | Jones | G06F 16/10 |
| 2012/0251072 | A1 * | 10/2012 | Cope | G09F 9/33 |
| | | | | 386/230 |
| 2013/0223673 | A1 * | 8/2013 | Davis | G06K 9/78 |
| | | | | 382/100 |
| 2015/0041616 | A1 * | 2/2015 | Gentile | G06Q 10/087 |
| | | | | 248/550 |

(Continued)

FOREIGN PATENT DOCUMENTS

WO 2015063224 5/2015

*Primary Examiner* — Fateh M Obaid
(74) *Attorney, Agent, or Firm* — Fitch, Even, Tabin & Flannery LLP

(57) ABSTRACT

In some embodiments, apparatuses and methods are provided herein useful to provide an indication of stock level for products within a retail location. A marking material can be used on particular products to provide notification that the stock of the product is in or approaching a low stock situation. In some embodiments, a reader or sensor can be provided at or near a point of sale that is configured to detect the marking material and create a task.

20 Claims, 7 Drawing Sheets

(56) References Cited

U.S. PATENT DOCUMENTS

| | | | | |
|---|---|---|---|---|
| 2015/0254603 A1* | 9/2015 | Bashkin | ............... | G06Q 10/087 312/237 |
| 2017/0316371 A1* | 11/2017 | Jones | ..................... | H04N 7/185 |
| 2017/0330140 A1* | 11/2017 | Jones | ........................ | G01F 1/34 |

* cited by examiner

US 10,600,026 B2

STOCKING LEVEL INDICATION SYSTEM AND METHOD

CROSS-REFERENCE TO RELATED APPLICATIONS

This application claims the benefit of U.S. 62/359,933, filed Jul. 8, 2016, which is hereby incorporated by reference herein in its entirety.

TECHNICAL FIELD

This invention relates generally to retail stocking level indicating systems.

BACKGROUND

Retail stores often utilize modular shelving units to display products for sale. It can be important to maintain an accurate count of inventory during operation of the store. Pursuant to this, associates often have to count products on the shelves. It can be difficult for associates to accurately determine a count of products on the shelves and, as such, one method to ensure an accurate count is to remove all of the products from the shelves. Unfortunately, the associates must then restock the products on the shelves.

BRIEF DESCRIPTION OF THE DRAWINGS

Disclosed herein are embodiments of systems, apparatuses and methods pertaining a system that provides an indication of a stocking level of products stocked within a retail location. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to provide an indication of stock level for products within a retail location. Pursuant to this, a marking material can be used on particular products with the system to provide notification that the stock of the product is in or approaching a low stock situation. The marking material can be manually applied by associates, such as during a stocking procedure, or can dispensed by an assembly for a product support member.

In some embodiments, a reader or sensor can be provided at or near a point of sale that is configured to detect the marking material, such as during check-out, so that the marking material can be automatically detected by the system. The notification that a particular product is in or approaching a low stock state can save a retailer time and money by efficiently managing associate time and minimizing out-of-stock products.

Figure 1:
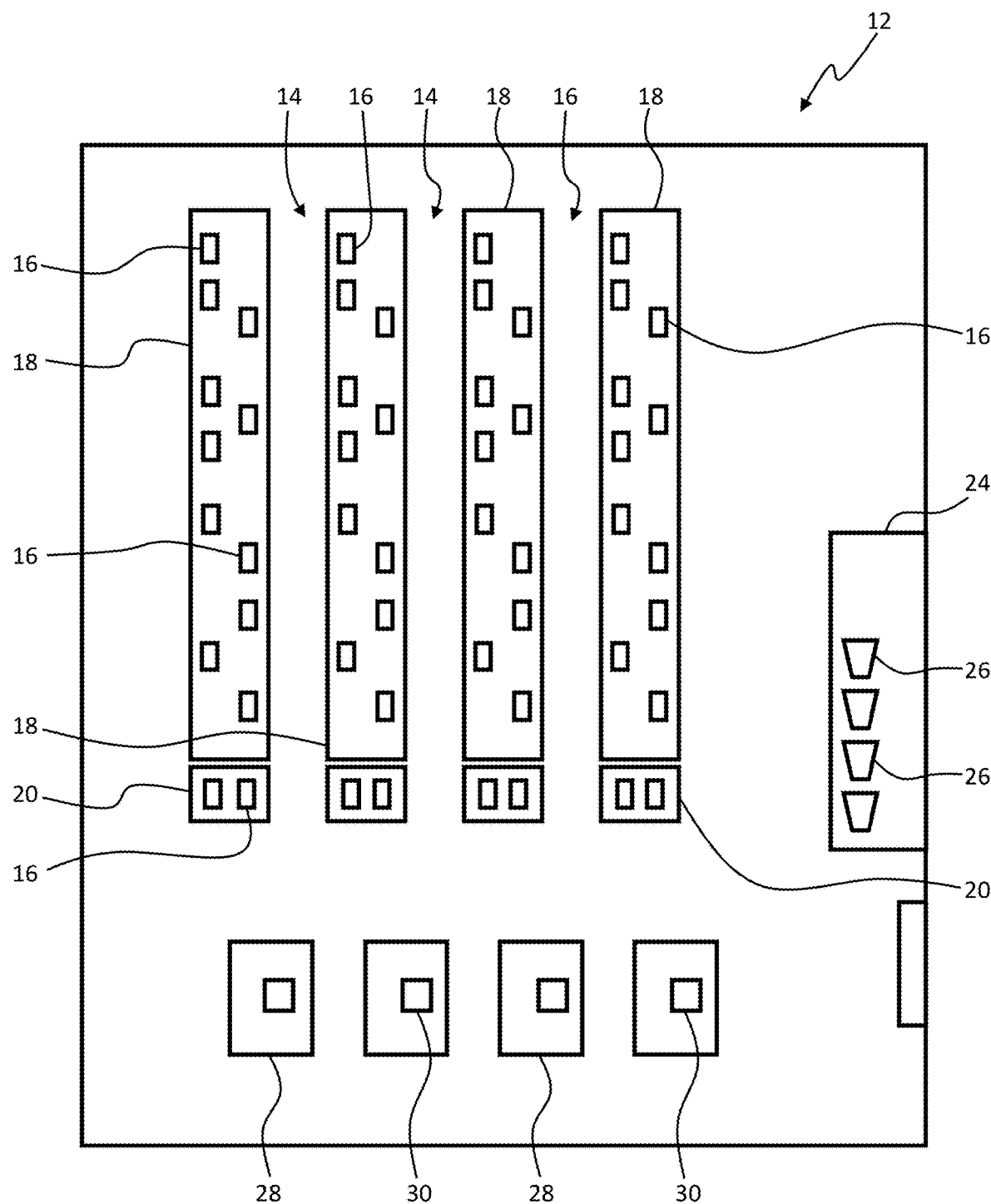
FIG. 1 is a diagrammatic view of a retail location in accordance with some embodiments.

As illustrated in FIG. 1, a retail location 12 can typically include a plurality of aisles 14 having products 16 disposed there along on various displays 18, such as shelving units, coolers, and the like, and on feature locations 20, which can be located at the end of the aisles 14, in free-standing displays, or the like. The displays 18 and feature locations 20 include product support members 22 configured to receive the products 16 thereon for display. A cart corral 24 is typically located near an entrance to the retail location 12 with carts 26 generally contained therein. As a customer enters the retail location 12, the customer can therefore get one of the carts 26 for the shopping trip. Thereafter, the customer will travel through the retail location 12 collecting products 16 and proceed to one or more point-of-sale locations 28 having point-of-sale devices 30.

Figure 2:
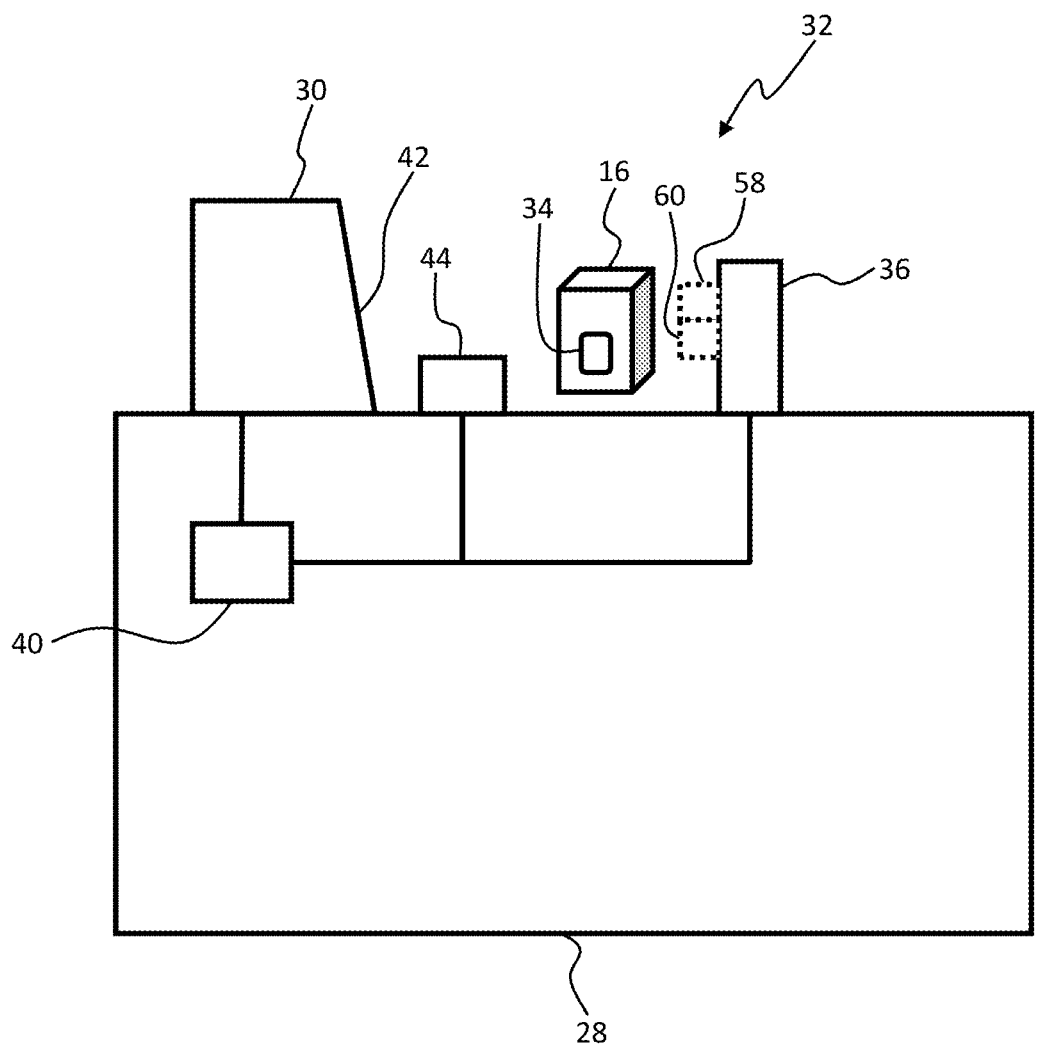
FIG. 2 is a diagrammatic side elevational view of a point-of-sale at a retail location in accordance with several embodiments.

A stock level indication system 32 for the retail location 12 is described herein with respect to FIGS. 2-8. The stock level indication system 32 includes a marking material 34 that can be detected by a reader or sensor device 36. By one approach, as shown in FIG. 2, the reader device 36 can be mounted to or disposed adjacent to the point-of-sale location 28 and, specifically, the point-of-sale device 30 thereof. Preferably, the reader device 36 is positioned and oriented at the point-of-sale location 28 so that products 16 purchased during the transaction pass within a reading or sensing distance of the reader device 36 so that the reader device 36 will detect the marking material 34 on any purchased products 16.

The reader device 36 can be coupled to a control circuit 40 and be configured to send a detection signal to the control circuit 40 when the marking material 34 is detected. The reader device 36 can be hardwired to the control circuit 40 or can be configured to communicate wirelessly therewith utilizing any suitable network or protocol. With the wireless communication approach, the reader device 36 can include a suitable transmitter or transceiver configured to send signals over the selected network or protocol. Additionally, the term control circuit as used herein refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 40 may be configured (for example, by using corresponding programming stored in a memory as will be well understood by those skilled in the art) to carry out one or more of the steps, actions, and/or functions described herein.

Advantageously, the control circuit 40 can also be coupled to the point-of-sale device(s) 30 that is, as commonly understood, configured to receive product information for a purchase transaction. Product information can be entered by user input 42, scanner 44, or any other suitable mechanism. So configured, the control circuit 40 can receive an identification of all products 16 purchased during a shopping trip and associate the product 16 purchased during detection of the marking material 34. The control circuit 40 can then send a low stock signal or create a task to restock the product 16 based on the detection.

Figure 3:
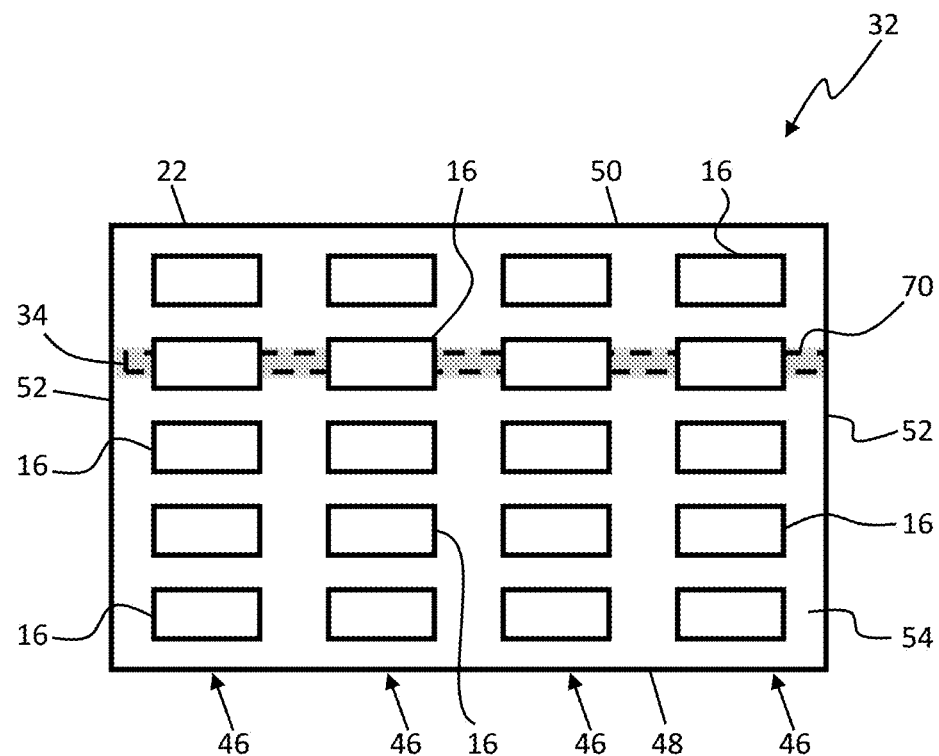
FIG. 3 is a top plan view of a product support member in accordance with some embodiments.
Figure 4:
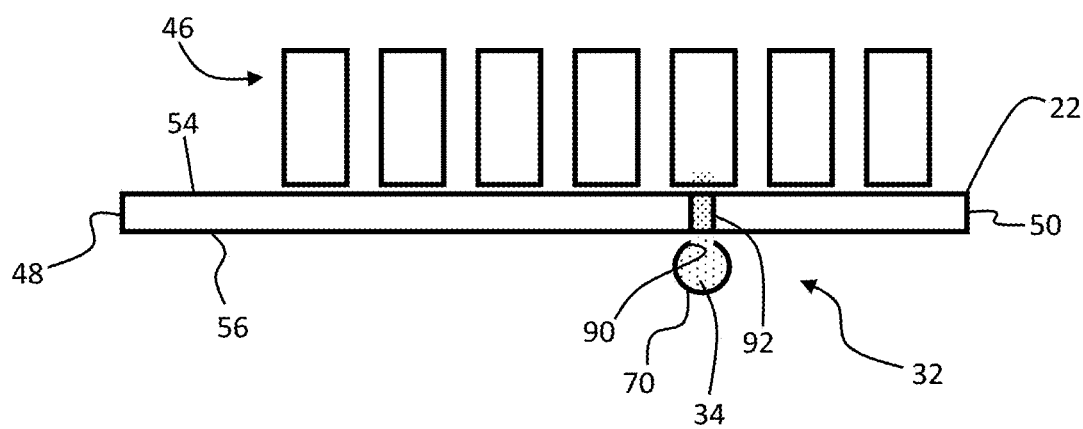
FIG. 4 is a side elevational view of the product support member of FIG. 3 in accordance with several embodiments.

Turning now to FIGS. 3 and 4, the marking material 34 is disposed on a product 16 within a product facing 46 on the product support member 22 at a predetermined depth therein, such as in an intermediate or end position within the product facing 46. By one approach, the predetermined depth can correspond to a rear half of the product support member 22. By another approach, the product 16 can be disposed generally at the middle of the facing 46, two-thirds of the facing 46, three-fourths of the facing 46, and so forth to provide an indication that the product 16 is in a low stock state or approaching a low stock state. Alternatively, the product 16 can be disposed at the end of the product facing 46 to provide an indication that the product is in a low stock, if there are other facings 46 of the product 16, or out-of-stock state.

In common configurations, the product support member 22 is generally rectangular with front and rear edges 48, 50 extending between side edges 52. Of course, other shapes can also be utilized. The product support member 22 includes an upper surface 54 on which the products 16 are stocked with the facings 46 thereof extending rearwardly along the product support 22 between the front and rear edges 48, 50 thereof and a lower surface 56.

When the reader device 36 detects the marking material 34, the detection will provide a general indication that a product 16 disposed at the predetermined depth within a product facing 46 has been purchased by a customer and, as such, the stock of that particular product 16 may be limited to only the products 16 on the product support member 22 that would be left in that facing 46. As such, it would be advantageous to the retailer to send an associate to check on the stock level of the product 16 and restock the product 16 if necessary.

The marking material 34 and the reader device 36 can take a variety of forms. By a first approach, the marking material 34 can be a machine readable code, such as a barcode, QR code, or the like. The machine readable code 34 can be adhered or printed on the particular product 16 as desired. As such, the reader device 36 can be a scanner configured to scan and read the machine readable code 34. By another approach, the marking material 34 can be an electro-luminescent liquid or material and the reader device 36 can include a light source 58 configured to illuminate the electro-luminescent material 34 and the reader device 36 can be an imager configured to detect the illuminated electro-luminescent material 34. The electro-luminescent material 34 can be adhered to the product 16 in the form of a label or the like, sprayed or otherwise applied to the product 16, and so forth. By yet another approach, the marking material 34 can be a ferrous material, such as dust or shavings, and the reader device 36 can include a magnetic portion 60 and the reader device 36 can be a detector configured to detect when the magnetic portion 60 attracts the ferrous material 34 thereto, as shown in FIG. 2. The ferrous material 34 can be adhered to the product 16, such as using a low tack adhesive, or label.

Figure 5:
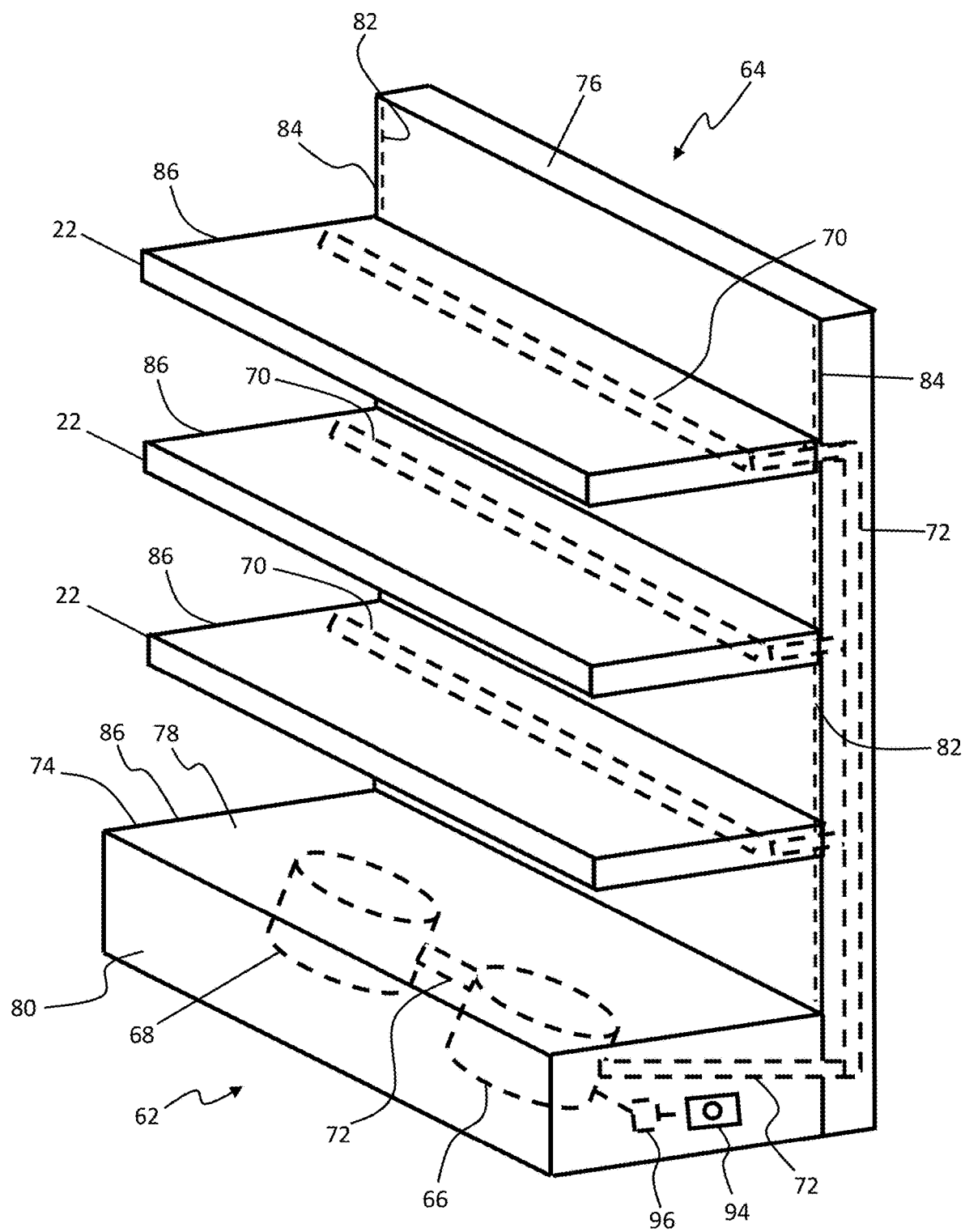
FIG. 5 is a perspective view of a shelving unit in accordance with some embodiments.
Figure 6:
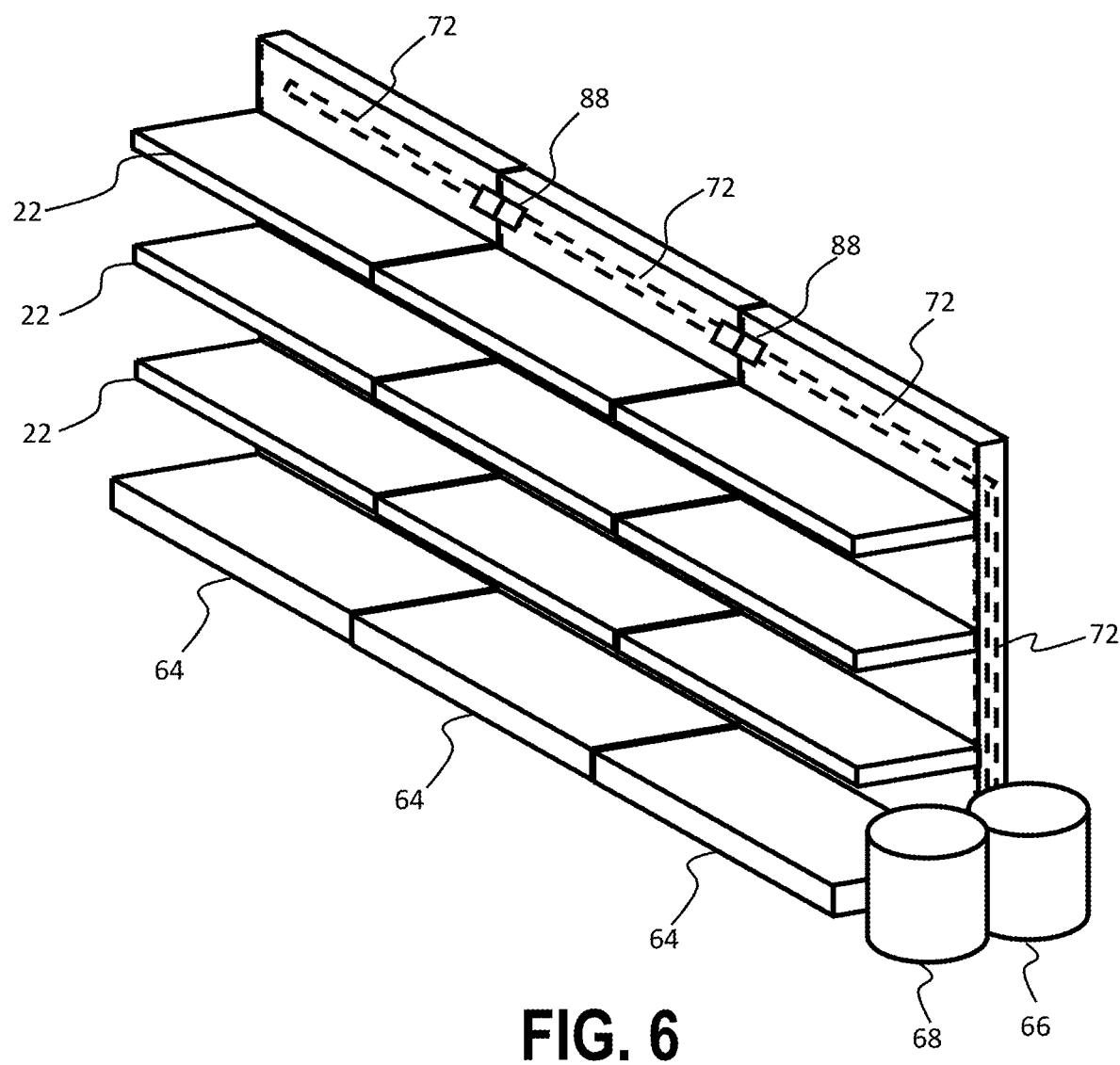
FIG. 6 is a perspective view of a plurality of shelving units in accordance with several embodiments.

By some approaches, associates can manually apply the marking material 34 on the products 16 during stocking of the product support member 22. By other approaches, the marking material 34 can be applied on the product with a delivery assembly 62, as shown in FIGS. 5 and 6. The delivery assembly 62 is shown with reference to a shelving unit 64, but other product displays 18, such as tables, coolers, racks, carts, and so forth with product support members 22 could also be utilized. By yet other approaches, the marking material 34 can be provided in a shelf-ready display having the product support member 22 therein. For example, the shelf ready display can be shipped to the retail location 12 with the marking material disposed on the product support member 22 thereof at the predetermined depth, such as that shown in FIG. 3. In another example, products 16 at the predetermined depth in the shelf ready display can be shipped to the retail location 12 with the marking material disposed thereon. With these examples, associates at the retail location 12 need not performed extra tasks with regard to the marking material 34.

The delivery assembly 62 of the product support member 22 can be configured to dispense the marking material 34 onto the product 16 disposed at the predetermined depth. The delivery assembly 62 can include a container 66 of the marking material 34, an air compressor 68, a dispensing member 70 disposed along a width of the product support member 22 at the predetermined depth thereof, and conduits 72 connecting the container 66 and the air compressor 68 to the dispensing member 70. The air compressor 68 is configured to release pressurized air through the conduits 72 to the dispensing member 70, which can have the marking material 34 distributed therein or the marking material 34 can be fed into the air supply, to force the marking material 34 through the dispensing member 70 onto the product 16 stocked at the predetermined depth of the product support 22. For embodiments utilizing a liquid marking material 34, such as the electro-luminescent liquid discussed above, the container 66 and compressor 68 can be combined, such that the compressor 68 contains compressed liquid marking material 34 therein, which can be selectively delivered through the conduits 72 to the dispensing member 70.

As illustrated, the shelving unit 64 includes a base portion 74 and a back wall 76 extending upwardly therefrom. The base portion 74 can include a base deck 78 and a kick plate 80, as commonly configured. In one form, a plurality of shelf notches 82 are vertically disposed adjacent to lateral edges 84 of the back wall 76 to provide anchor points for product support members or shelves 86 mounted to the shelving unit 64. Of course, the shelves 86 can be mounted to the back wall 76 in any suitable way, including using hardware, snap-fit structure, friction fitting, or the like. By one approach, the product support member 22 as described herein can be a shelf 86 of the shelving unit 64.

In one form, the conduits 72 can be mounted to the back wall 76 of the shelving unit 64, such as the front or rear surface thereof, and/or can be disposed within at least a portion of the back wall 76 to connect the container 66 and the air compressor 68 to the dispensing member 70 mounted to one or more of the shelves 86. Although compressed air is described herein, it will be understood that any suitable gas can be utilized.

By one approach, as shown in FIG. 5, each shelving unit 64 can have an associated container 66 and air compressor 68. The air compressor 68 can be disposed within the base portion 74, as illustrated, mounted to the back wall 76, disposed therealong, or disposed in other suitable locations. In this form, the container 66 and air compressor 68 would be dedicated to supply only one shelving unit 64 and can thus have a relatively small capacity.

By another approach, as shown in FIG. 6, one container 66 and one air compressor 68 can supply a plurality of shelving units 64 arranged in a row or otherwise disposed adjacent to one another, such as along an aisle 14. In this approach, the conduits 72 can include connectors 88 configured to connect the conduits 72 of adjacent shelving units 64 together. The container 66 and air compressor 68 of this form can be disposed at the end of the aisle 14, within the base portion 74 of one of the shelving units 64, mounted to the back wall 76 of one of the shelving units 64, disposed behind one of the shelving units 64, or disposed in other suitable locations. In this form, the container 66 and air compressor 68 can be sized to provide a sufficient supply to all of the shelving units 64 coupled thereto.

The dispensing member 70 can be mounted to the lower surface 56 of the product support member 22 or be disposed at least partially therein. The dispensing member 70 extends between the side edges 52 so that the dispensing member 70 can apply the marking material 34 to each facing 46 on the product support member 22. The dispensing member 70 can be a trough, channel, or pipe with openings or an open top 90 aligned with an opening or openings 92 extending through the product support member 22. So configured, when compressed air travels through the conduits 72 and mixes with the marking material 34 supplied from the container 66, the marking material 34 is forced through the conduits 72, the dispensing member 70, the opening 90 in the dispensing member 70, the opening 92 in the product support member 22, and onto the desired products 16. By one approach, the delivery assembly 62 can be configured to operate via actuation of a user switch device 94, via a control circuit 96 operating the assembly 62 according to a predetermined schedule, or combinations thereof.

In some embodiments, the marking material 34 can be disposed on an upper surface 97 of a pallet or other bulk storage structure 98 to track inventory stock levels for products 16 in situations prior to monitoring stock levels on the front-of-store displays 18 described above. As such, the system 32 can notify the store or distribution center when stock of a given product 16 is running low. With this configuration, low stock corresponds to the lowest layer of product 16 stocked on the pallet 98. The marking material 34 is transferred from the pallet upper surface 97 to the lowest layer of product 16 when the products 16 are stocked thereon. The marking material 34 can be applied by a user using any suitable mechanism for the particular marking material 34, options of which are set forth above. For example, the user can spread the marking material 34 by hand, using a pressurized can, a pump device, and so forth. Of course, the user can alternatively apply the marking material 34 directly to the products 16 intended for the lowest layer on the pallet 98.

In these embodiments, the reader or sensor 36 can be provided at or near the point of sale location 28 as described above or can be mounted or disposed adjacent to a conveyor or other conveyance mechanism 99. By one approach, the pallet 98 is disposed in the back of the store or in a warehouse/distribution center environment. When additional products are needed from the pallet 98, a user removes individual products 16 from the pallet 98 and loads the products 16 onto the conveyor 99 or other mechanism, such as an automated robot. The reader 36 can be oriented to scan the products 16 as the conveyance mechanism 99 transports the products 16 to a next location to determine whether the marking material 34 is disposed on any of the products 16. In response to detection of the marking material 34, the reader 36 can send a signal to the control circuit 40 to process the signal as described above to order additional stock of the product 16, for example. The notification that a particular product 16 is in or approaching a low stock state can save a retailer time and money by efficiently managing associate time and minimizing out-of-stock products.

In some embodiments, a stock level indication system is described herein that includes a product support having front and rear edges and that is configured to display products in one or more product facings thereon. The system further includes a marking material disposed on a product stocked at a predetermined depth of the product support between the front and rear edges thereof, the predetermined depth corresponding to an intermediate position in a product facing, a reader device disposed adjacent to a point of sale and configured to detect the marking material; and a control circuit operably coupled to the reader device and the point of sale. The control circuit is configured to receive the detection of the marking material from the reader device and output a signal to create a task in response to receiving the detection of the marking material.

By several approaches, the system can further include a delivery assembly of the product support configured to dispense the marking material onto the product disposed at the predetermined depth. By further approaches, the delivery assembly can include a container of the marking material, an air compressor, and a dispensing member disposed along a width of the product support at the predetermined depth thereof, where the air compressor configured to release air to force the marking material through the dispensing member onto the product stocked at the predetermined depth of the product support.

By some approaches, the marking material can be a ferrous material and the reader device can be a magnetic portion. By other approaches, the marking material can be an electro-luminescent material and the reader device can be a light source configured to illuminate the electro-luminescent material and an imager configured to detect the illuminated electro-luminescent material. By yet other approaches, the marking material can be a machine-readable pattern and the reader device can be a scanner configured to read the machine-readable pattern.

By several approaches, the control circuit can further be configured to receive identification of a product purchased during detection of the marking material from the point of sale. Further, the control circuit configured to output the signal to create the task can include the control circuit configured to output a low stock signal corresponding to the product to create a restocking task.

Figure 7:
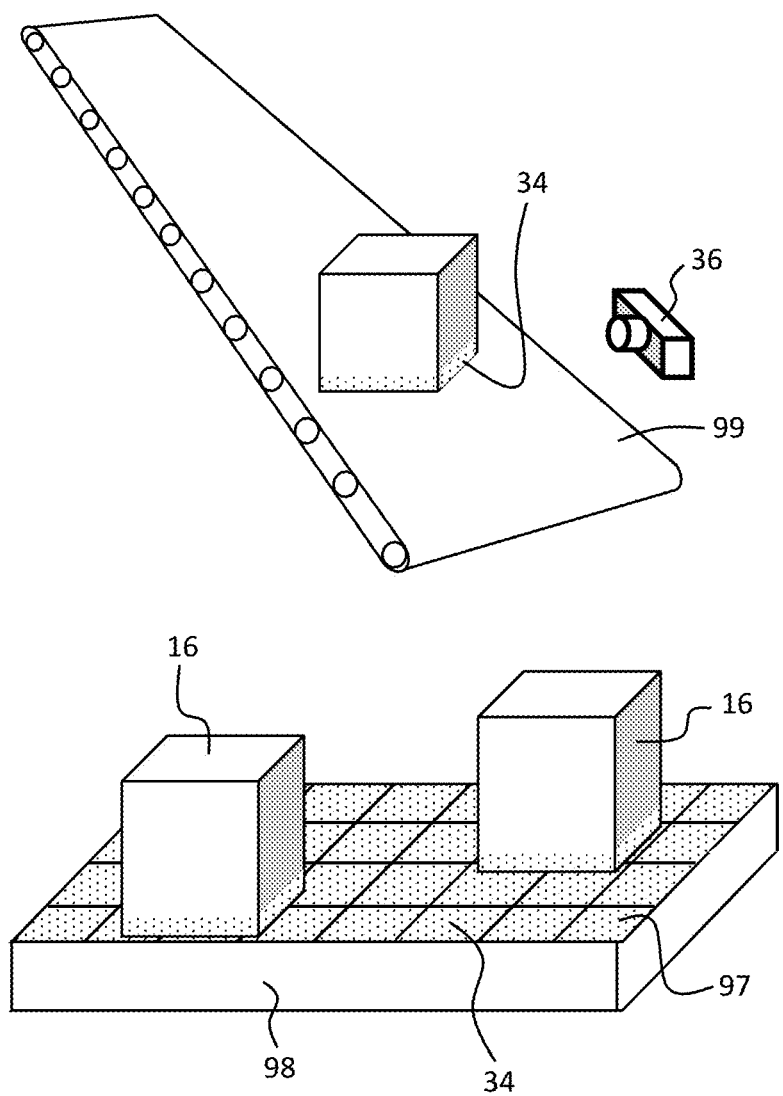
FIG. 7 is a perspective view of a pallet and conveyance mechanism in accordance with some embodiments.
Figure 8:
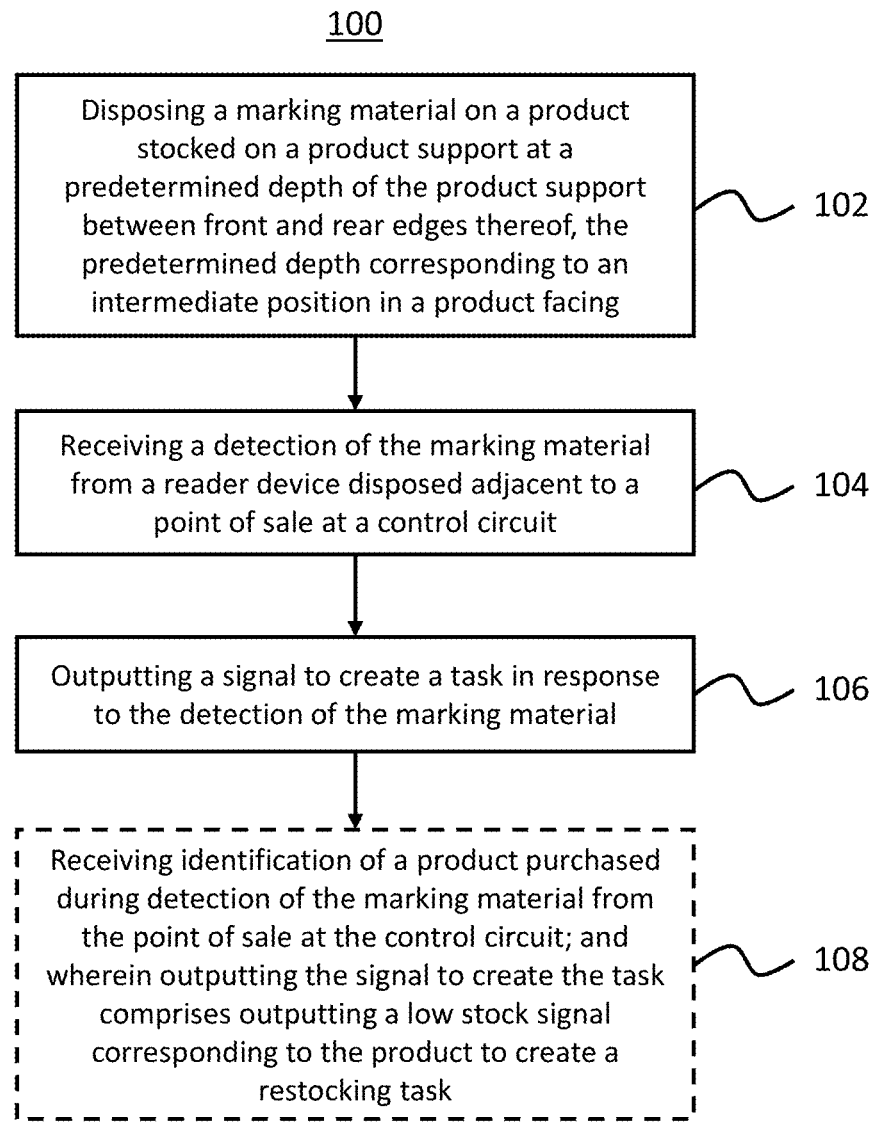
FIG. 8 is a flowchart in accordance with some embodiments.

In several embodiments and as shown in FIG. 7, a method 100 for determining a stock level is described herein that includes disposing 102 a marking material on a product stocked on a product support at a predetermined depth of the product support between front and rear edges thereof, the predetermined depth corresponding to an intermediate position in a product facing; receiving 104 a detection of the marking material from a reader device disposed adjacent to a point of sale at a control circuit, and outputting 104 a signal to create a task in response to the detection of the marking material.

By some approaches, disposing the marking material on the product can include dispensing the marking material onto the product with a delivery assembly of the product support. By further approaches, dispensing the marking material onto the product can include releasing air from an air compressor to force the marking material through a dispensing member disposed along a width of the product support at the predetermined depth thereof.

By several approaches, the marking material can be a ferrous material and receiving the detection of the marking material from the reader device can include receiving a detection of the marking material with a magnetic portion thereof. By other approaches, the marking material can be an electro-luminescent material and receiving the detection of the marking material from the reader device can include receiving a detection of the marking material with an imager of the reader device configured to detect the electro-luminescent material illuminated by a light source. By yet other approaches, the marking material can be a machine-readable pattern and receiving the detection of the marking material from the reader device can include receiving a detection of the marking material with a scanner of the reader device configured to read the machine-readable pattern.

By some approaches, the method can further include receiving 108 identification of a product purchased during detection of the marking material from the point of sale at the control circuit; and wherein outputting the signal to create the task comprises outputting a low stock signal corresponding to the product to create a restocking task.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A stock level indication system, the system comprising:
   a product support having front and rear edges and configured to display products in one or more product facings thereon;
   a marking material disposed on a product stocked at a predetermined depth of the product support between the front and rear edges thereof, the predetermined depth corresponding to an intermediate or end position in a product facing;
   a reader device disposed adjacent to a point of sale and configured to detect the marking material;
   a delivery assembly of the product support configured to dispense the marking material onto the product disposed at the predetermined depth, wherein the delivery assembly comprises a container of the marking material and a dispensing member disposed along a width of the product support at the predetermined depth thereof; and
   a control circuit operably coupled to the reader device and the point of sale, the control circuit configured to:
      receive the detection of the marking material from the reader device; and
      output a signal to create a task in response to receiving the detection of the marking material.

2. The system of claim 1, wherein the delivery assembly further comprises an air compressor configured to release air to force the marking material through the dispensing member onto the product stocked at the predetermined depth of the product support.

3. The system of claim 2, wherein the delivery assembly further comprises a switch configured to operate the air compressor upon actuation thereof.

4. The system of claim 2, wherein the air compressor is configured to operate according to a predetermined schedule.

5. The system of claim 1, wherein the marking material comprises a ferrous material and the reader device comprises a magnetic portion.

6. The system of claim 1, wherein the marking material comprises an electro-luminescent material; and the reader device comprises a light source configured to illuminate the electro-luminescent material and an imager configured to detect the illuminated electro-luminescent material.

7. The system of claim 1, wherein the marking material comprises a machine-readable code; and the reader device comprises a scanner configured to read the machine-readable code.

8. The system of claim 1, wherein the product support comprises a shelf mounted to a shelving unit.

9. The system of claim 1, wherein the predetermined depth comprises a depth within a rear half of the product support.

10. The system of claim 1, wherein the control circuit is further configured to receive identification of a product purchased during detection of the marking material from the point of sale; and the control circuit configured to output the signal to create the task comprises the control circuit configured to output a low stock signal corresponding to the product to create a restocking task.

11. A method for determining a stock level, the method comprising:
   disposing, by a delivery assembly of a product support, a marking material on a product stocked on the product support at a predetermined depth of the product support between front and rear edges thereof, the predetermined depth corresponding to an intermediate or end position in a product facing, wherein the delivery assembly comprises a container of the marking material and a dispensing member disposed along a width of the product support at the predetermined depth thereof;
   receiving a detection of the marking material from a reader device disposed adjacent to a point of sale at a control circuit, and
   outputting a signal to create a task in response to the detection of the marking material.

12. The method of claim 11, wherein disposing the marking material on the product comprises dispensing the marking material onto the product with the delivery assembly of the product support.

13. The method of claim 12, wherein dispensing the marking material onto the product comprises releasing air from an air compressor to force the marking material through the dispensing member.

14. The method of claim 13, wherein releasing the air from the air compressor comprises actuating a switch configured to operate the air compressor.

15. The method of claim 13, wherein releasing the air from the air compressor comprises releasing the air from the compressor according to a predetermined schedule.

16. The method of claim 11, wherein the marking material comprises a ferrous material and receiving the detection of the marking material from the reader device comprises receiving a detection of the marking material with a magnetic portion thereof.

17. The method of claim 11, wherein the marking material comprises an electro-luminescent material; and receiving the detection of the marking material from the reader device comprises receiving a detection of the marking material with an imager of the reader device configured to detect the electro-luminescent material illuminated by a light source.

18. The method of claim 11, wherein the marking material comprises a machine-readable pattern; and receiving the detection of the marking material from the reader device comprises receiving a detection of the marking material with a scanner of the reader device configured to read the machine-readable pattern.

19. The method of claim 11, further comprising receiving identification of a product purchased during detection of the marking material from the point of sale at the control circuit; and wherein outputting the signal to create the task comprises outputting a low stock signal corresponding to the product to create a restocking task.

20. The system of claim 1, wherein the dispensing member applies the marking material onto the product upon an actuation of a user switch device.

\* \* \* \* \*